United States Patent

Bradtke et al.

Patent Number: 5,530,062
Date of Patent: Jun. 25, 1996

[54] PRODUCTION OF LOW GLOSS ADDITIVES FOR THERMOPLASTIC RESINS

[75] Inventors: Greg R. Bradtke, Ballston Spa, N.Y.; Robert H. Wildi, Parkersburg; Jack A. Hill, Vienna, both of W. Va.; Kenneth G. Powell, Raleigh, N.C.

[73] Assignee: General Electric Company, Schenectady, N.Y.

[21] Appl. No.: 461,470

[22] Filed: Jun. 5, 1995

[51] Int. Cl.⁶ .......................... C08L 69/00; C08L 63/00; C08L 25/12; C08J 3/22

[52] U.S. Cl. .............. 525/65; 525/67; 525/109; 525/113

[58] Field of Search .............. 525/65, 67, 109, 525/113

[56] References Cited

U.S. PATENT DOCUMENTS 5,026,777  6/1991  Jalbert et al. .................. 525/65
5,336,701  8/1994  Wildi .................. 523/411

FOREIGN PATENT DOCUMENTS 639609  2/1995  European Pat. Off. .

OTHER PUBLICATIONS

U. S. patent application Ser. No. 08/110,142, filed Aug. 20, 1993.

*Primary Examiner*—David Buttner
*Attorney, Agent, or Firm*—William H. Pittman

[57] ABSTRACT

Gels useful as low gloss additives for blends of addition polymers, such as ABS resins, with polycarbonates are prepared by a melt blending operation in which a polyepoxide such as 3,4-epoxycyclohexyl 3,4-epoxycyclohexanecarboxylate is blended with at least one addition polymer such as a styrene-acrylonitrile copolymer, and concurrently with at least one aromatic polycarbonate in at least two increments. The first increment comprises about 20–60% of total polycarbonate and the second increment is subsequently introduced.

20 Claims, No Drawings

PRODUCTION OF LOW GLOSS ADDITIVES FOR THERMOPLASTIC RESINS

BACKGROUND OF THE INVENTION

This invention relates to the production of low gloss thermoplastic resins, and more particularly to an improved method for formulating an additive which imparts low gloss properties.

The production of low gloss blends of polycarbonates and acrylonitrile-butadiene-styrene graft copolymers (hereinafter "ABS resins") is described in various publications and patents. A particularly useful additive is the reaction product of a polyepoxide with a polymer containing nitrile groups. U.S. Pat. No. 5,026,777, for example, discloses the incorporation of a polyepoxide into an alloy of ABS and polycarbonate in a single blending step. Copending, commonly owned application Ser. No. 08/110,142 describes an improved process in which a gel is first produced by the reaction of a polyepoxide with a polymer containing nitrile groups, typically a styrene-acrylonitrile copolymer (hereinafter sometimes "SAN copolymer"). Said gel is next dispersed in a first thermoplastic resin such as a polycarbonate to produce a concentrate which is then blended with further resin such as ABS resin or an ABS resin-polycarbonate mixture.

These operations are usually carried out in an extruder. The results include improvement in temperature control, minimized degradation and improved gel utilization.

Certain problems may be encountered in this process by reason of unfavorable viscosity properties of the materials employed. SAN copolymers, for example, have low viscosity which minimizes viscous heating during blending with the polyepoxide, making it difficult to reach a suitable reaction temperature. Upon reaction, however, viscosity builds to the point where passage through the extrusion die and formation of a strandable product are very difficult to attain.

SUMMARY OF THE INVENTION

The present invention is based on the discovery of an improved processing method which permits facile viscous heating when necessary and which facilitates removal of the gel from the extruder as a strandable product. Said method also permits the attainment of low gloss by the use of a minimum of polyepoxide and gel. These improvements are results of improved incorporation of polyepoxide and reaction thereof with the nitrile groups in the resin, as well as improved temperature control later in the blending process. Other improved properties are also obtainable.

In one of its aspects, the invention is a method for preparing a low gloss additive composition for a resin system, comprising:

(A) melt blending, under reactive conditions, at least one polyepoxide with at least one addition polymer containing structural units derived from at least one ethylenically unsaturated nitrile to form a polymeric gel; and concurrently (B) melt blending said gel with at least one aromatic polycarbonate in at least two increments, the first increment comprising about 20–60% by weight of said polycarbonate being introduced simultaneously with said polyepoxide and addition polymer and remaining increments comprising the balance of said polycarbonate being introduced subsequently.

Another aspect of the invention is a low gloss additive composition prepared according to the above-described method. Still another aspect is a thermoplastic resin composition comprising at least one second addition polymer, at least one aromatic polycarbonate and an additive composition prepared by said method.

DETAILED DESCRIPTION; PREFERRED EMBODIMENTS

The polyepoxides which may be employed in the method of this invention include simple aliphatic diepoxides such as dodecatriene dioxide, dipentene dioxide and 1,2,7,8-diepoxyoctane; bis-glycidyl ethers/esters such as the bisglycidyl ether of bisphenol A and its condensation products; alicyclic diepoxides such as 3,4-epoxycyclohexyl 3,4-epoxycyclohexanecarboxylate and bis(3,4-epoxycyclohexylmethyl) adipate; mixed aliphatic/alicyclic diepoxides such as vinylcyclobutene dioxide, vinylcyclopentadiene dioxide and butenylcyclopentene dioxide; glycidyl ethers of novolak resins; epoxidized heterocycles such as triglycidyl isocyanurate; and epoxidized oils such as epoxidized tall oil, linseed oil and soybean oil. The preferred polyepoxides for most purposes are alicyclic polyepoxides and especially 3,4-epoxycyclohexyl 3,4-epoxycyclohexylcarboxylate, which is available from Union Carbide under the trade designation "ERL 4221".

Also employed is at least one addition polymer containing structural units derived from at least one ethylenically unsaturated nitrile such as acrylonitrile, methacrylonitrile or fumaronitrile. Acrylonitrile is usually preferred, as are copolymers in which at least some of the other units are derived from a vinylaromatic compound. Suitable copolymers of this type include styrene-acrylonitrile copolymers, α-methylstyrene-acrylonitrile copolymers, acrylonitrile-styrene-methacrylic acid ester terpolymers, ABS resins, acrylonitrile-ethyl acrylate-styrene copolymers and rubber-modified acrylonitrile-styrene-butyl acrylate polymers.

The rubber-free polymers are preferred, with SAN copolymers being especially preferred. Copolymers comprising at least 5% and preferably about 15–35% by weight of nitrile structural units are particularly useful. Unless special conditions are employed, a SAN copolymer generally comprises about 75% styrene and about 25% acrylonitrile structural units irrespective of the monomer proportions in the copolymerization mixture, and those are therefore the proportions most often employed. The weight average molecular weight of the addition polymer, as determined by gel permeation chromatography, is not critical, but is most often in the range of about 30,000–150,000.

The polycarbonates employed in the method of this invention typically comprise structural units of the formula

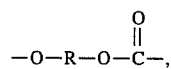

wherein R is a divalent aromatic organic radical. Suitable R values include m-phenylene, p-phenylene, 4,4'-biphenylene, 2,2-bis(4-phenylene)propane and similar radicals such as those which correspond to the aromatic dihydroxy compounds disclosed by name or formula (generic or specific) in U.S. Pat. No. 4,21 7,438, the disclosure of which is incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all R radicals are hydrocarbon radicals.

R preferably has the formula $-A^1-Y-A^2-$, wherein each of $A^1$ and $A^2$ is a monocyclic divalent aromatic radical and Y is a bridging radical in which one or two atoms separate $A^1$ from $A^2$. The free valence bonds in the latter formula are usually in the meta or para positions of $A^1$ and $A^2$ in relation to Y.

The $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone.

For reasons of availability and particular suitability for the purposes of this invention, the preferred polycarbonates are derived from 2,2-bis(4-hydroxyphenyl)propane or "bisphenol A", in which Y is isopropylidene and $A^1$ and $A^2$ are each p-phenylene. Weight average molecular weights, as determined by gel permeation chromatography relative to polystyrene, are generally in the range of about 10,000–100,000.

In step A of the method of this invention, the polyepoxide and addition polymer are conventionally melt blended under reactive conditions. Melt blending may be batchwise or continuous. It is generally preferred to employ continuous addition using an extruder or similar equipment. Most often, the polyepoxide and addition polymer are fed into the feed throat of the extruder. An epoxide ring-opening reagent, most often a sulfonic acid such as dodecylbenzenesulfonic acid, is generally added concurrently. The proportion of polyepoxide and catalyst are most often about 1.5–6.0% and about 800–1800 ppm, respectively, based on addition polymer. Water may also be introduced at this point, the proportion thereof when employed being in the range of about 0.05–1.0% based on addition polymer.

The product obtained by melt blending the polyepoxide with the addition polymer under the above-described reactive conditions is a gel which is effective as a low gloss additive for various resin systems. According to the present invention, in step B said gel is melt blended with polycarbonate concurrently with its production. Such concurrent blending has several advantages. For example, viscosity build is noted upon blending of the gel with the polycarbonate, leading to a temperature increase upon blending which facilitates the gel-forming reaction. However, a decrease in viscosity then occurs as a result of polycarbonate addition, limiting further temperature increase, reducing viscous heating and die pressure and producing a strandable product with minimum energy input. A further advantage is a substantial increase in gloss reducing efficiency of the additive composition when incorporated in a resin system. Thus, less additive composition can be employed to produce an equivalent reduction in gloss.

The proportion of polycarbonate blended with the gel composition according to the invention is usually about 25–75% by weight of total addition polymer present in said gel composition. It is melt blended into said composition in at least two, and most often only two, increments. The first, comprising about 20–60% and preferably about 45–60% by weight of total polycarbonate, is introduced simultaneously with the polyepoxide and addition polymer, most often at the feed throat of the extruder. The remainder is introduced subsequently. In the case of extrusion, addition of the remainder may be through one or more feed ports, usually one, at or beyond the halfway point of the extruder.

The maximum melt temperature during step B is generally up to about 350° C. It should preferably be no higher than 330° C., since degradation of the gel may take place relatively rapidly above that temperature. Most preferably, the maximum temperature is 325° C. The maximum temperature is ordinarily attained at the die at the point of exit from the extruder, with temperatures in the range of about 220°–300° C. being typical at earlier stages of the extrusion.

The additive compositions of the present invention may be incorporated in thermoplastic polymers to impart low gloss properties thereto. Typical polymers in which they may be employed include ABS resins and blends thereof with aromatic polycarbonates. Such blends typically contain about 0–85%, most often about 45–85%, by weight of polycarbonate including polycarbonate employed during the method of the invention, with the balance being ABS resin. The additive composition is typically employed in the resin composition in the amount of about 1–15% and preferably about 2–10% by weight of total resins.

The ABS resins which may be employed include those prepared by bulk polymerization and by grafting of styrene and acrylonitrile on a previously formed polybutadiene latex, as well as mixtures of bulk polymerized and grafted resin. Grafted resin is often preferred. A possible intermediate in the grafting method of preparation is a SAN copolymer. The ABS resin may also be a blend of a SAN copolymer with a previously formed ABS polymer typically having about 25–75% and preferably at least about 50% by weight of butadiene units, the latter hereinafter being designated "high rubber graft". In any event, the proportions of combined styrene and acrylonitrile in the ABS resin are most often about 60–90% and preferably about 70–90%.

Proportions in the ABS resin of acrylonitrile and styrene taken individually are subject to wide variation, depending on the properties desired in the resinous article. The styrene preferably comprises about 60–90% by weight, and most often about 75% for reasons previously explained, of the mixture of the two monomers.

The thermoplastic resin composition may contain other materials in addition to the above-described polymers. These include flame retardants, initiators, inhibitors, stabilizers, plasticizers, lubricants, pigments, anti-static agents, impact modifiers, fillers and mold release agents.

The blend of the additive composition with the thermoplastic resin is typically prepared by melt blending. Continuous melt blending is preferred, with extrusion as described hereinabove being particularly preferred.

In evaluating the products of this invention and other products, a parameter commonly used is the Gardner gloss index. Another parameter generally having a substantial correlation with the Gardner gloss index is the "percent gel". It is determined by weighing a resin sample containing about 0.5 gram of reacted and unreacted SAN copolymer, placing it in a stainless steel cage and extracting with chloroform in a Soxhlet extractor for at least 24 hours. Entrained solvent is then removed by shaking and evaporation and the weight of the wet sample is measured to the nearest 0.05 g. The sample is then dried at 90° C. in a vacuum oven and weighed to the nearest milligram. Percent gel is the final dry weight as a percentage of the original weight of SAN copolymer. A second measurement, the "swell index", is the ratio of the weight of the extracted, wet gel to the final dry weight; it is roughly inversely proportional to the percent gel and may be useful to check for inaccuracies in weighing and the like.

The invention is illustrated by the following examples. All parts, percentages and ratios are by weight. Molecular weights are weight average and were determined by gel permeation chromatography.

EXAMPLES 1–3

Gloss reducing gels were prepared by extrusion on a 58-mm Werner-Pfleiderer twin screw extruder of a mixture of 2 parts of a styrene-acrylonitrile copolymer having a molecular weight of about 70,000 and containing about 25% acrylonitrile units and 1 part of a bisphenol A polycarbonate having a molecular weight relative to polystyrene of about 40,000. Also in the blend were 4% of 3,4-epoxycyclohexyl 3,4-epoxycyclohexanecarboxylate and 1,350 ppm of dodecylbenzenesulfonic acid, both based on SAN copolymer. A portion of the polycarbonate was added with the other constituents at the feed port of the extruder, with the remaining polycarbonate being added downstream at about the halfway point of the extruder. Extrusion temperatures were in the range of 220°–300° C. and higher at the extrusion die, as shown below in the table.

The gels obtained as products were extruded at a level of 3.75 parts with 65.25 parts of polycarbonate, 15 parts of the styrene-acrylonitrile copolymer, 16 parts of a high rubber graft copolymer having a molecular weight of about 125,000 and comprising 50% polybutadiene and 50% styrene and acrylonitrile (3:1 ratio) units and minor proportions of lubricants and antioxidants. The Gardner gloss indices, percent gel and swell index, as well as the percent torque of the extruder and the temperature of the extruded strand at the die, were determined and are listed in the following table, in comparison with a control in which the entire portion of polycarbonate was added at the feed port.

|  | Control | Example 1 | Example 2 | Example 3 |
| --- | --- | --- | --- | --- |
| Polycarbonate ratio, port/downstream | 100/0 | 50/50 | 30/70 | 20/80 |
| Gardner gloss, 60° | 31 | 6 | 18 | — |
| Percent gel | 47.8 | 77.6 | 81.3 | 82.0 |
| Swell index | 28.1 | 18.7 | 16.2 | 16.8 |
| Percent torque | 80 | 77 | 76 | 76 |
| Strand temperature at die, °C. | 337 | 324 | 329 | 327 |

It is apparent from the table that the method of the invention produces a gel which provides a substantial improvement in low gloss characteristics, as shown by both Gardner gloss and percent gel, in comparison to the control. The invention also requires less energy during extrusion than the control and affords an extruded strand at a temperature below the desired maximum of 330° C. Particularly advantageous is Example 1 where polycarbonate is added at a 50/50 ratio, which affords a minimum gloss and a strand temperature below the preferred maximum of 325° C.

What is claimed is:

1. A method for preparing a low gloss additive composition for a resin system, comprising:

melt blending, under reactive conditions, constituents comprising at least one polyepoxide and at least one addition polymer containing structural units derived from at least one ethylenically unsaturated nitrile to form a polymeric gel; and concurrently melt blending said constituents with at least one aromatic polycarbonate in at least two increments, the first increment comprising about 20–60% by weight of said polycarbonate being introduced simultaneously with said polyepoxide and addition polymer and remaining increments comprising the balance of said polycarbonate being introduced subsequently.

2. A method according to claim 1 wherein the addition polymer is a styrene-acrylonitrile copolymer.

3. A method according to claim 2 wherein the polycarbonate is a bisphenol A polycarbonate.

4. A method according to claim 2 wherein the polyepoxide is an alicyclic polyepoxide.

5. A method according to claim 4 wherein the polyepoxide is 3,4-epoxycyclohexyl 3,4-epoxycyclohexanecarboxylate.

6. A method according to claim 4 wherein said constituents also comprise an epoxide ring-opening reagent.

7. A method according to claim 6 wherein the ring-opening reagent is dodecylbenzenesulfonic acid.

8. A method according to claim 6 wherein the polyepoxide and ring-opening reagent are present in the amounts of about 1.5–6.0% and about 800–1800 ppm, respectively, based on styrene-acrylonitrile copolymer.

9. A method according to claim 2 wherein said melt blending is by extrusion and the balance of said polycarbonate is introduced through one or more feed ports at or beyond the halfway point of the extruder.

10. A method according to claim 9 wherein the blending temperature does not exceed 330° C.

11. A method according to claim 9 wherein the blending temperature does not exceed 325° C.

12. A method according to claim 11 wherein the proportion of polycarbonate is about 25–75% by weight of total addition polymer.

13. A method according to claim 12 wherein the polycarbonate is blended in two increments.

14. A method according to claim 13 wherein the blending is by extrusion.

15. A method according to claim 1 wherein the first increment of polycarbonate comprises about 45–60% thereof.

16. A low gloss additive composition prepared by the method of claim 1.

17. A thermoplastic resin composition comprising at least one second addition polymer, at least one aromatic polycarbonate and an additive composition according to claim 16.

18. A composition according to claim 17 wherein the second addition polymer is an ABS resin.

19. A composition according to claim 17 wherein the polycarbonate is a bisphenol A polycarbonate.

20. A composition according to claim 17 wherein the polyepoxide is 3,4-epoxycyclohexyl 3,4-epoxycyclohexanecarboxylate.

* * * * *